Oct. 30, 1934.    J. B. EWART    1,979,028
PAWL AND RATCHET MECHANISM
Filed Oct. 20, 1932    2 Sheets-Sheet 1

INVENTOR
JAMES B. EWART
BY Ward, Crosby & Neal
ATTORNEYS

Oct. 30, 1934.    J. B. EWART    1,979,028
PAWL AND RATCHET MECHANISM
Filed Oct. 20, 1932    2 Sheets-Sheet 2

INVENTOR
JAMES B. EWART
BY Ward, Crosby & Neal
ATTORNEYS

Patented Oct. 30, 1934

1,979,028

UNITED STATES PATENT OFFICE

1,979,028

PAWL AND RATCHET MECHANISM

James B. Ewart, Flushing, N. Y., assignor to The Teleregister Corporation, New York, N. Y., a corporation of Delaware Application October 20, 1932, Serial No. 638,719

6 Claims. (Cl. 74—143)

This invention relates to improvements in pawl and ratchet mechanisms.

In certain constructions heretofore used the point of the tooth of the pawl engaged and moved over the working face of the tooth of the ratchet wheel causing considerable wear and friction, and also causing the tooth of the pawl to dig into the tooth of the ratchet wheel and actually lock up the mechanism. In other well known designs the tooth of the pawl initially engaged the straight tooth of the ratchet wheel on a line contact, with the result that the impact of the tooth of the driving pawl caused the tooth of the driving pawl to dig into the tooth of the ratchet wheel and to lock up the mechanism.

My invention consists in improvements eliminating the above objections and which consist in providing for a surface engagement of substantial area between the tooth of the pawl and the tooth of the ratchet wheel as they initially engage and which is maintained until the tooth of the pawl reaches the base of the tooth of the ratchet, the design of the pawl and the teeth of the ratchet being preferably such that the tooth of the pawl at the limit of its travel substantially fills the space between adjacent teeth of the ratchet wheel.

Another object of the invention is to provide engaging surfaces between the tooth of the pawl and the adjacent teeth of the ratchet wheel to cause the ratchet wheel to be moved in a predetermined desired position after long use and to be locked securely in said position against any movement by force applied to the ratchet wheel.

Other objects of the invention will appear from the following description taken in connection with the accompanying drawings, in which Fig. 1 is a side view of an indicator unit to which my invention has been applied in practice;

Figure 1:
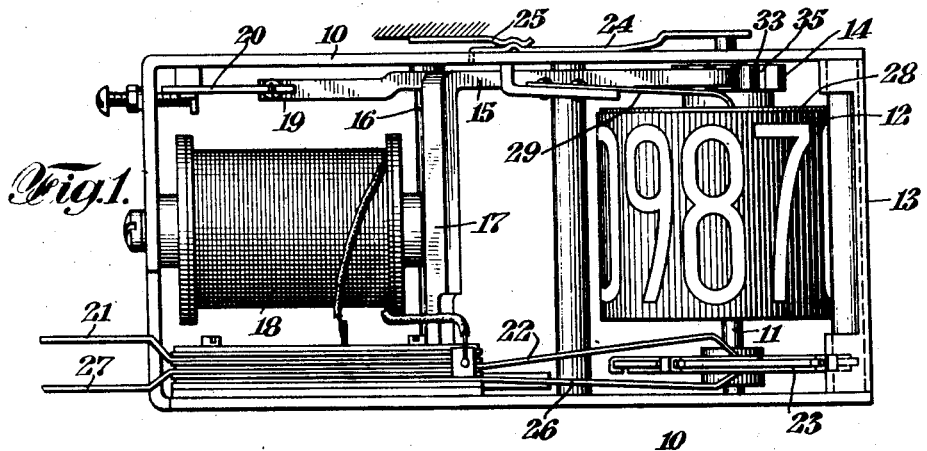

For the purposes of illustration I have disclosed an indicator unit constructed in accordance with the disclosure in an application of Merton L. Haselton, Ser. No. 423,599, filed January 27, 1930, and it is to be distinctly understood that the invention is applicable to other forms of indicators and to any other mechanisms which it is desired to adjust, and that the operating fork may be driven by wholly mechanical means as well as by electromagnetic means as shown.

The indicator disclosed for purposes of illustrating the principles of this invention comprises a U-shaped indicator frame 10 in which are supported the ends of an indicator shaft 11 on which an indicator drum 12 is suitably secured, such drum in the present instance being provided with eleven positions, ten of which may bear the numerals 1 to 9 and 0 and the eleventh of which located between the 0 and 1 may be left blank, as is well understood in this art. A mask 13 suitably secured to the indicator frame 10 is provided with an aperture which constitutes a frame for the digit to be exhibited. Several of these indicator units may be arranged side by side in close relation and the digits of associated units may constitute digits of a number which it is desired to exhibit. For this reason it is desirable to have all of the digits bear the same relation to the apertures in their respective masks.

The indicator shaft 11 is driven by a ratchet wheel 14 and an operating fork 15 constructed in accordance with the principles of my invention, and which will be described more in detail hereafter. The operating fork 15 is pivotally supported on a rod 16 carried in the side members of the frame 10, and in the mechanism disclosed in which the operating fork is driven by a magnet the operating fork is provided with an armature 17 on which is formed an ear which pivots on the rod 16. The operating magnet 18 may be secured to the base of the U-shaped frame 10 in any suitable manner as indicated. When the magnet is energized the operating fork 15 will be moved from the position shown in Fig. 2 to the position shown in Fig. 5, and upon deenergization of the magnet the operating fork will be restored to the position shown in Fig. 2 by means of a spring 19 which is secured to the operating fork and to any suitable, and preferably adjustable, means 20 supported on the indicator frame 10.

As shown in said application, the operating magnet 18 may be successively energized over a circuit including a slip connection 21, brush 22, commutator 23, the shaft 11, and connections 24 and 25 to ground on an indicator board until the indicator displays blank through the aperture in the mask 13. When it is desired to set up the indicator to show a new set-up, the operating circuit will include the slip connection 21, brush 22 and commutator 23, brush 26 and slip connection 27, which is connected to ground during setting-up operations.

A retaining ratchet disk 28 suitably secured for movement with the shaft, ratchet wheel and indicator, serves to prevent backward movement of the indicator, a pawl 29 secured to the frame being provided for cooperation with the ratchet disk.

Figure 6:
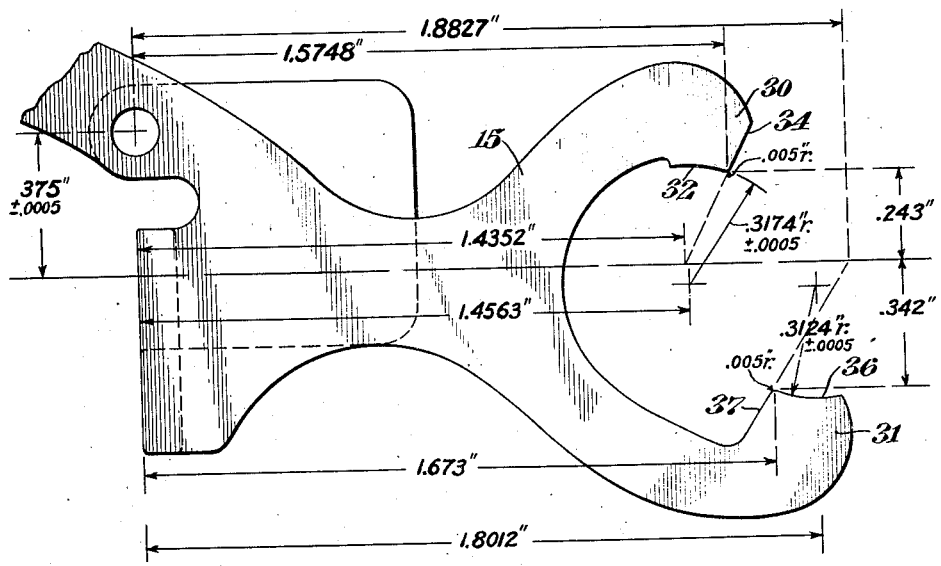
Fig. 6 shows a development of an operating fork constructed in accordance with the principles of my invention.
Figure 7:
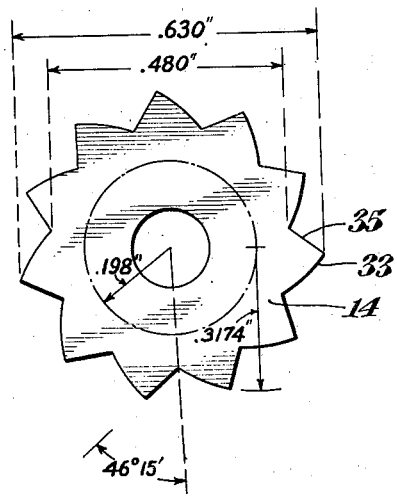
Fig. 7 shows a development of a ratchet wheel or double barring gear with which the operating fork of Fig. 6 cooperates.

In Fig. 6 I have disclosed an operating fork on an enlarged scale and have indicated thereon suitable dimensions for the construction of a fork which has been used in practice. In Fig. 7 I have shown suitable dimensions for a ratchet wheel with which the fork of Fig. 6 cooperates. It is to be understood, of course, that I do not desire to be limited to the exact manner of development and dimensions given in these figures. I have found, however, that operating forks and ratchet wheels constructed according to Figs. 6 and 7 have proven satisfactory in operation by reducing frictional wear between the operating fork and the ratchet wheel to a minimum, and by providing for an alignment of the indicia with the aperture in the mask throughout the period of continued use.

As shown in the drawings, the upper tooth 30 of the operating fork 15 is provided with a concave curved face 32 of the same radius of curvature as the convexly curved working face 33 of the tooth of a ratchet wheel. The other face 34 of the tooth 30 is preferably flat or straight to engage a corresponding flat or straight face 35 of the next succeeding tooth of the ratchet wheel.

Figure 2:
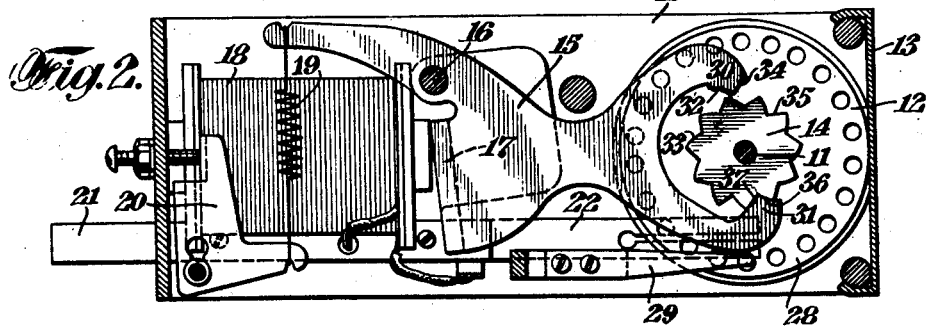
Fig. 2 is a longitudinal section taken immediately inside of the upper side member of the frame as shown in Fig. 1 showing the driving pawl or operating fork in its home position.
Figures 3, 4, 5:
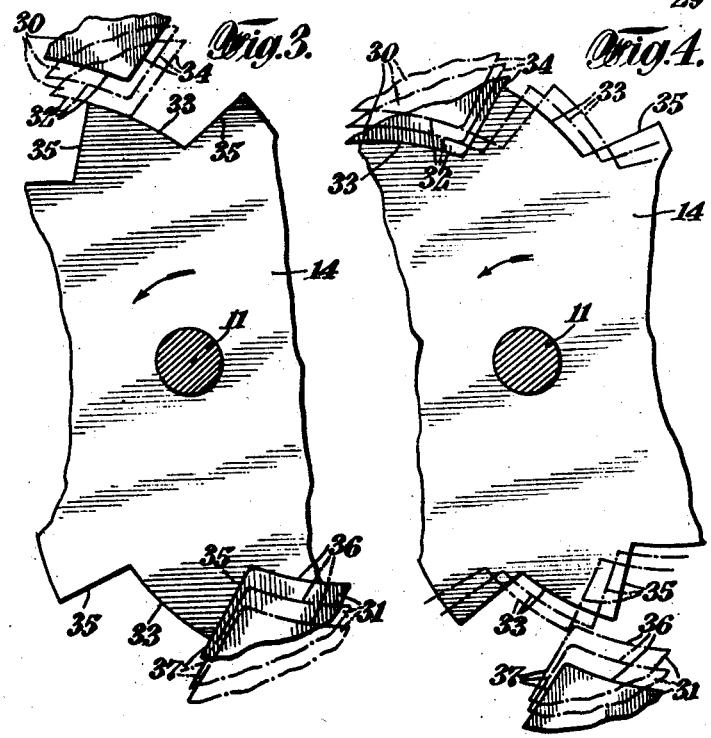
Fig. 3 shows three positions of the teeth of the operating fork as it is moved from its normal home position to cause one of its teeth to engage a tooth of the ratchet wheel.
Fig. 4 shows three positions of the teeth of the operating fork and of the ratchet wheel as the fork continues its forward movement to drive the ratchet wheel.
Fig. 5 shows the position of the operating fork at the end of its forward stroke.

Figs. 2 and 3 show the position of the operating fork when the magnet is deenergized, in which position of the fork the lower tooth 31 engages between adjacent teeth of the ratchet wheel. The lower tooth 31 is provided with a concave curved face 36 and a straight face 37 which conform respectively to the convex curved face 33 and the straight face 35 of adjacent teeth of the ratchet wheel. The surfaces 36 and 37 on the tooth 31 of the operating fork cooperate with the surfaces 33 and 35 on the teeth of the ratchet wheel to prevent an unauthorized change in the set-up on the indicator wheel, the surfaces 35 and 37 effectually preventing overthrow during operation. These surfaces cooperate to properly align the indicia with the aperture in the mask. The curved faces on the teeth of the operating fork and the ratchet wheel are of the same radius of curvature. In practice the centers may be selected so that the high point or end of the tooth of the ratchet wheel is engaged by the working face of the fork in which case the ratchet wheel is made of softer material than the fork. This causes the teeth of the ratchet wheel to wear into perfect fit with the teeth of the operating fork.

Fig. 3 shows three positions of the operating fork as it moves from the position shown in Fig. 2 to bring the upper tooth 30 into engagement with the adjacent tooth of the ratchet wheel, in which position there is a surface contact between the working face of the tooth of the operating fork and the working face of the tooth of the ratchet wheel.

Fig. 4 shows three other positions of the tooth 30 of the operating fork in each of which there is a surface engagement between the tooth 30 of the operating fork and the tooth of the ratchet wheel. In this figure the operating fork is shown at the end of its forward movement. When the operating magnet 18 is deenergized, the operating fork is returned, and the face 36 of the tooth 31 of the operating fork cooperates with the face 33 of the adjacent tooth of the ratchet wheel to rotate the ratchet wheel in the same manner in which the surface 32 of the upper tooth 30 of the operating fork cooperates with the surface 33 of the tooth of the ratchet wheel during the forward stroke of the operating fork. As the tooth 31 enters the space between the teeth of the ratchet wheel it rotates the ratchet wheel and in its final position locks the ratchet wheel against movement.

If desired, the working surfaces of the teeth of the pawl may be convex and those of the teeth of the ratchet may be concave, the radii of curvature being the same and the centers of the curvatures being located to provide for surface contact throughout the working stroke, as in the preferred embodiment shown in the drawings.

While the invention has been shown in connection with an electromagnetically operated operating fork in connection with a double barring gear for adjusting indicators, it is to be understood that in so far as the invention is concerned the operating fork might be driven by mechanical means, and that the mechanism might be used for adjusting means other than the indicating means.

While the invention has been shown in a single embodiment which has been specifically described, it is to be understood that other forms and embodiments may be suggested to those skilled in the art upon understanding this invention, and that it is the intention to cover all equivalent structures, and that words of description imported into the claims from the specification are not to be construed as words of limitation.

What I claim is:

1. In a pawl and ratchet mechanism, a ratchet wheel provided with a series of teeth each tooth having a convex outer working face, and an operating pawl provided with a tooth having a concave inner working face engaging said working face of the tooth of the ratchet, the convex outer working face of the tooth of the ratchet wheel and the concave inner working face of the tooth of the operating pawl having the same radius of curvature, the radius chosen being such as to cause the operating pawl to engage the tooth with a surface contact and to maintain such surface contact throughout the entire working stroke of the pawl.

2. In a pawl and ratchet mechanism, a ratchet wheel provided with a series of teeth each tooth having a convex outer working face, and an operating pawl provided with a tooth having a concave inner working face engaging said working face of the tooth of the ratchet, the convex outer working face of the tooth of the ratchet wheel and the concave inner working face of the tooth of the operating pawl having the same radius of curvature, the radius chosen being such as to cause the concave working face of the operating pawl to engage the convex working face of the tooth with a surface contact and to maintain such contact throughout the entire working stroke of the pawl, the tooth of the operating pawl and the tooth of the ratchet wheel being also provided with faces contacting at the end of the operating stroke of the pawl to stop the ratchet wheel, the faces being arranged to prevent the momentum of the ratchet wheel from camming the tooth of the operating pawl out of the space between adjacent teeth of the ratchet wheel.

3. In a pawl and ratchet mechanism, a ratchet wheel provided with a series of teeth each having a convex outer working face and a flat face for arresting the movement of the wheel, and an operating fork provided with spaced teeth cooperating with the teeth of the ratchet wheel located on opposite sides of the ratchet wheel, said teeth on said operating fork being provided with concave working faces maintaining a surface contact with the convex working face of the cooperating tooth of the ratchet wheel during the working stroke of the tooth on the fork, each tooth of said operating fork also being provided with a flat end face cooperating with the flat faces of the teeth of the ratchet wheel to prevent overthrow of the ratchet wheel, the construction being such that at the end of a working stroke the teeth of the operating fork will completely fill the space between adjacent teeth of the ratchet wheel to properly align the ratchet wheel.

4. In a pawl and ratchet mechanism, a ratchet wheel provided with a series of teeth each having a convex outer working face and a flat face for arresting the movement of the wheel, and an operating fork provided with spaced teeth cooperating with the teeth of the ratchet wheel located on opposite sides of the ratchet wheel, said teeth on said operating fork being provided with concave working faces maintaining a surface contact with the cooperating tooth of the ratchet wheel during the working stroke of the tooth of the fork, each tooth of said operating fork also being provided with a flat end face cooperating with the flat faces of the teeth of the ratchet wheel to prevent overthrow of the ratchet wheel, the construction being such that at the end of a working stroke one of the teeth of the operating fork will completely fill the space between adjacent teeth of the ratchet wheel to properly align the ratchet wheel, and that in the home position of the operating fork the tooth of the fork which is in engagement with the teeth of the ratchet wheel will lock the ratchet wheel against rotation by application of force to said ratchet wheel.

5. In a pawl and ratchet mechanism, a ratchet wheel provided with a series of teeth each having a curved working face, a pawl having a curved working face cooperating with the working faces of the teeth of the ratchet wheel, the curved working faces of the teeth of the ratchet wheel and the pawl having substantially the same radius of curvature, and means whereby the face on the pawl will engage the face on the cooperating tooth of the ratchet wheel with a surface contact of substantial extent and maintain such surface contact when said pawl and ratchet wheel are moved relatively to each other.

6. A pawl and ratchet mechanism, both having radially extending teeth, the said teeth on the pawl and ratchet being engaged over a substantial portion of their surfaces immediately on the beginning of a working stroke, and means including the position of the pivotal axis of said pawl with respect to the axis of rotation of said ratchet to continuously increase the amount of said surface engagement during the completion of said stroke.

JAMES B. EWART.